United States Patent
Starsinic et al.

(10) Patent No.: US 11,444,986 B2
(45) Date of Patent: *Sep. 13, 2022

(54) DEVICE TRIGGERING

(71) Applicant: Convida Wireless, LLC, Wilmington, DE (US)

(72) Inventors: Michael F. Starsinic, Newtown, PA (US); Dale N. Seed, Allentown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,913

(22) Filed: Oct. 27, 2020

(65) Prior Publication Data

US 2021/0044632 A1 Feb. 11, 2021

Related U.S. Application Data

(63) Continuation of application No. 16/363,252, filed on Mar. 25, 2019, now Pat. No. 10,848,526, which is a
(Continued)

(51) Int. Cl.
*H04L 65/1069* (2022.01)
*H04W 4/50* (2018.01)
(Continued)

(52) U.S. Cl.
CPC ........... *H04L 65/1069* (2013.01); *H04W 4/50* (2018.02); *H04W 4/70* (2018.02); *H04W 12/04* (2013.01); *H04W 12/35* (2021.01)

(58) Field of Classification Search
CPC ...... H04L 65/1069; H04W 4/50; H04W 4/70; H04W 12/0023; H04W 12/04
See application file for complete search history.

(56) References Cited

U.S. PATENT DOCUMENTS 6,516,343 B1 2/2003 Pong et al.
6,950,660 B1 9/2005 Hsu et al.
(Continued)

FOREIGN PATENT DOCUMENTS

CN 102281334 12/2011
WO 2011/112683 A1 9/2011
(Continued)

OTHER PUBLICATIONS

3GPP TR 33.868 V0.13.0, 3rd Generation Partnership Project; Technical Specification Group Services and System Aspects; Security Aspects of machine-Type and Other Mobile Data Applications Communications Enhancements; (Release 12); Apr. 2013, 91 pages.

(Continued)

*Primary Examiner* — Alina A Boutah
(74) *Attorney, Agent, or Firm* — BakerHostetler

(57) ABSTRACT

Service layer and application triggering may be used in a machine-to-machine environment. In an embodiment, an existing service layer procedure, such as registration, may allow a device or gateway service layer or application to indicate to a machine-to-machine server what port is listened to for triggers. In another embodiment, triggering may be used to provide bootstrapping instructions, including temporary bootstrapping identifiers, in trigger requests. In another embodiment, triggering may be used to assist with event notification. Service layer or application instructions may be embedded inside of trigger payloads. A trigger payload format is defined.

20 Claims, 10 Drawing Sheets

Related U.S. Application Data continuation of application No. 15/728,885, filed on Oct. 10, 2017, now Pat. No. 10,250,647, which is a continuation of application No. 14/270,970, filed on May 6, 2014, now Pat. No. 9,800,621.

(60) Provisional application No. 61/819,970, filed on May 6, 2013.

(51) Int. Cl.
  *H04W 4/70* (2018.01)
  *H04W 12/04* (2021.01)
  *H04W 12/30* (2021.01)

(56) References Cited

U.S. PATENT DOCUMENTS

| | | |
|---|---|---|
| 7,565,142 B2 | 7/2009 | Netanel |
| 8,838,806 B2 | 9/2014 | Lu et al. |
| 9,167,517 B2 | 10/2015 | Mackenzie |
| 9,800,621 B2 | 10/2017 | Starsinic et al. |
| 10,250,647 B2 | 4/2019 | Starsinic et al. |
| 2006/0205387 A1 | 9/2006 | Laitinen |
| 2007/0192838 A1 | 8/2007 | Laitinen et al. |
| 2008/0259942 A1 | 10/2008 | Skog et al. |
| 2009/0265543 A1 | 10/2009 | Khetawat et al. |
| 2009/0305674 A1 | 12/2009 | Teittinen et al. |
| 2009/0307474 A1 | 12/2009 | Johnston |
| 2011/0016321 A1* | 1/2011 | Sundaram ............... H04L 67/34 713/171 |
| 2011/0060900 A1 | 3/2011 | Zhong et al. |
| 2011/0128911 A1 | 6/2011 | Shaheen |
| 2011/0134841 A1 | 6/2011 | Shaheen |
| 2011/0140846 A1 | 6/2011 | Blanz et al. |
| 2011/0249636 A1 | 10/2011 | Cherian et al. |
| 2011/0252235 A1 | 10/2011 | Dolan et al. |
| 2012/0030358 A1* | 2/2012 | Mackenzie ....... H04W 52/0229 709/226 |
| 2012/0047558 A1 | 2/2012 | Sundaram et al. |
| 2012/0058764 A1 | 3/2012 | Kang et al. |
| 2012/0164954 A1 | 6/2012 | Karampatsis et al. |
| 2012/0170451 A1 | 7/2012 | Viswanathan et al. |
| 2012/0202508 A1 | 8/2012 | Toth et al. |
| 2012/0254959 A1 | 10/2012 | Schmidt et al. |
| 2012/0266223 A1 | 10/2012 | Yegin et al. |
| 2012/0284785 A1 | 11/2012 | Salkintzis et al. |
| 2013/0007231 A1* | 1/2013 | Forssell ................ H04L 41/082 709/221 |
| 2013/0013792 A1 | 1/2013 | Norp |
| 2013/0042011 A1 | 2/2013 | Sugizaki et al. |
| 2013/0094444 A1 | 4/2013 | Lai et al. |
| 2013/0121483 A1 | 5/2013 | Murakami et al. |
| 2013/0188515 A1 | 7/2013 | Pinheiro et al. |
| 2013/0203412 A1* | 8/2013 | Starsinic ............... H04L 61/303 455/435.1 |
| 2013/0208703 A1* | 8/2013 | Sugimoto ............... H04L 12/66 370/331 |
| 2013/0212236 A1* | 8/2013 | Foti ....................... H04W 76/10 709/221 |
| 2013/0239189 A1 | 9/2013 | Ionescu et al. |
| 2013/0272252 A1 | 10/2013 | Jain et al. |
| 2013/0301501 A1 | 11/2013 | Olvera-hernandez et al. |
| 2013/0310027 A1* | 11/2013 | Foti ....................... H04W 4/70 455/432.1 |
| 2013/0318218 A1 | 11/2013 | Foti et al. |
| 2013/0329653 A1 | 12/2013 | Russell et al. |
| 2013/0339438 A1 | 12/2013 | Cherian et al. |
| 2014/0016629 A1 | 1/2014 | Pancorbo Marcos et al. |
| 2014/0056193 A1 | 2/2014 | Huang et al. |
| 2014/0086143 A1* | 3/2014 | Foti ....................... H04W 4/70 370/328 |
| 2014/0086144 A1* | 3/2014 | Foti ....................... H04W 8/10 370/328 |
| 2014/0089478 A1 | 3/2014 | Seed et al. |
| 2014/0106794 A1* | 4/2014 | Atarius ................. H04W 4/14 455/466 |
| 2014/0115574 A1 | 4/2014 | Valentine et al. |
| 2014/0128050 A1* | 5/2014 | Bas Sanchez .......... H04W 8/22 455/418 |
| 2014/0128062 A1 | 5/2014 | Batchu et al. |
| 2014/0136673 A1 | 5/2014 | Anpat et al. |
| 2014/0155074 A1 | 6/2014 | Xu |
| 2014/0192659 A1 | 7/2014 | Tian et al. |
| 2014/0198728 A1 | 7/2014 | Zhou et al. |
| 2014/0215043 A1* | 7/2014 | Ryu ....................... G06F 16/955 709/223 |
| 2014/0256324 A1 | 9/2014 | Mohanty et al. |
| 2014/0337940 A1* | 11/2014 | Slavov .................. H04W 8/26 726/5 |
| 2014/0351403 A1 | 11/2014 | Lin et al. |
| 2015/0012744 A1* | 1/2015 | Chen ..................... H04L 9/0866 713/155 |
| 2015/0055640 A1* | 2/2015 | Wang .................... H04W 88/16 370/338 |
| 2015/0089061 A1 | 3/2015 | Li et al. |
| 2015/0282247 A1 | 10/2015 | Batchu et al. |
| 2015/0358824 A1 | 12/2015 | Kim et al. |
| 2016/0119281 A1 | 4/2016 | Tanaka et al. |
| 2016/0165379 A1 | 6/2016 | Yu et al. |
| 2016/0183071 A1 | 6/2016 | Shinada et al. |
| 2016/0226828 A1 | 8/2016 | Bone |

FOREIGN PATENT DOCUMENTS

| | | |
|---|---|---|
| WO | 2011/153731 A1 | 12/2011 |
| WO | 2012/060019 A1 | 5/2012 |
| WO | 2014/182694 A1 | 11/2014 |

OTHER PUBLICATIONS

3GPP TS 29.368, Tsp interface protocol between the MTC Interworking Function (MTC-IWF) and Service Capability Server (SCS), Dec. 2012.

3rd Generation Partnership Project (3GPP), "Routing a Device Trigger to the Target Application"; 3rd Generation Partnership Project vol. SA WG2; Research in Motion UK Limited; Oct. 2, 2012; 4 pages.

3rd Generation Partnership Project (3GPP), MTC Device Triggering Issues; vol. SA WG2; Motorola Mobility; Jul. 2012; 4 pages.

3rd Generation Partnership Project; (3GPP), TS 23.682 V11.3.0, 3rd Generation Partnership Project; Technical Specification Group Services and System Aspects; Architecture enhancements to facilitate communications with packet data networks and applications (release 11); Dec. 2012; 29 pages.

ETSI TS 102 921 Machine-to-Machine Communications (M2M); mia, dia and mid Interfaces, Feb. 2012, 538 pages.

ETSI TS 102690 v010101 sub.-Machine-to-Machine Communications (M2M); Functional Architecture, Oct. 2011-280pp.

Forsberg et al., "Protocol for Carrying Authentication for Network Access (PANA)", Network Working Group, RFC#5191, May 2008, 46 pages.

* cited by examiner

DEVICE TRIGGERING

CROSS-REFERENCE TO RELATED APPLICATIONS

This application is a continuation of application Ser. No. 16/363,252 filed Mar. 25, 2019 which is a continuation of application Ser. No. 15/728,885 filed Oct. 10, 2017, now U.S. Pat. No. 10,250,647 issued Apr. 2, 2019 which is a continuation of application Ser. No. 14/270,970, filed on May 6, 2014, now U.S. Pat. No. 9,800,621 issued Oct. 24, 2017, which claims the benefit of U.S. Provisional Patent Application No. 61/819,970, filed on May 6, 2013, entitled "SERVICE LAYER AND APPLICATION TRIGGERING METHODS," the contents of each application are hereby incorporated by reference herein in their entirety.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

Both the 3$^{rd}$ Generation Partnership Project (3GPP) and the European Telecommunications Standards Institute (ETSI), which is one of the standards bodies that is part of 3GPP, have defined architectures to support M2M communications. Specifically, 3GPP has defined an architecture for Machine Type Communication (MTC) in its TS 23.682. ETSI defines its ETSI M2M architecture in its TS 102 690.

Generally, in both architectures, an M2M entity (e.g., an M2M functional entity such as device, gateway, server/platform that may be implemented by hardware or a combination of hardware and software) may provide an application or service. For example, a light sensor may provide data indicating detected light levels or a thermostat may provide temperature data and the ability to adjust air conditioning controls. This data may be made available as a "resource" that may be accessed by other M2M entities and that essentially serves as a means to exchange data between M2M entities. A resource may be a uniquely addressable representation of data that may be addressed using a Universal Resource Indicator (URI). The availability of such resources may be communicated among M2M entities via an M2M service capabilities layer (SCL).

The M2M SCL is a functional entity that may be implemented by hardware or a combination of hardware and software and provides functions exposed on reference points (i.e., functional interfaces between M2M entities). For example, the M2M SCL may provide common (service) functionalities that are shared or commonly used by different M2M applications and/or services. These common functionalities may be exposed using a set of open interfaces. Additionally, M2M service capabilities may use cellular core network functionalities through a set of exposed interfaces (e.g., existing interfaces specified by 3GPP, 3GPP2, ETSI TISPAN, etc.) and may also interface to one or more other core networks.

FIG. 1 is a diagram illustrating the architecture for MTC defined in 3GPP TS 23.682. In this architecture, services capability server (SCS) 112 (also sometimes referred to as an M2M server) is an entity that offers services to MTC applications. As described in TS 23.682, to support both an indirect and a hybrid model of MTC, one or more instances of an MTC InterWorking Function (MTC-IWF) reside in the home public land mobile network (HPLMN) above line 118. An MTC-IWF may be a standalone entity or a functional entity of another network element. The MTC-IWF hides the internal public land mobile network (PLMN) topology and relays or translates signaling protocols used over the Tsp reference point to invoke specific functionality in the PLMN.

As shown in FIG. 1, MTC-IWF 116 resides in the 3GPP core network (CN), and it is able to communicate with a User Equipment (UE)—which may be any type of computing device, such as a mobile phone, sensor, actuator or any other type of M2M device—over several interfaces that are part of the "control plane" of the architecture, such as the T4 and T5 reference points defined by 3GPP. As further shown, SCS 112 communicates with the MTC-IWF via a "Tsp" interface defined by 3GPP. A UE normally communicates with an SCS via the "user plane" of the network. The control plane may be generally described as the communication path that primarily carries signaling traffic over a network. The user plane (sometimes known as the data plane, forwarding plane, carrier plane, or bearer plane) is the communication path that carries user traffic, such as voice communications and data communications (e.g., e-mails or web information from the Internet). In cellular communications, examples of control plane messaging are a page, short message service message, a location area update, an attach, detach, etc.

FIG. 2 is a diagram illustrating a system 120 in accordance with the ETSI M2M architecture defined by ETSI in its TS 102 690. Note that this diagram is simplified to facilitate description of the subject matter disclosed herein. As shown in FIG. 2, the system 120 may comprise a plurality of network domains, such as network domain 122, network domain 130, network domain 135, and network domain 138. Each network domain may include a network service capability layer (NSCL), such as NSCL 126, NSCL 131, NSCL 136, and NSCL 139. Each NSCL may interface with a respective network application, such as network application 127 and network application 132 in network domain 122 and network domain 130, respectively.

As further shown, a network domain, such as network domain 122, may further comprise one or more devices, such as device 145, and one or more gateways, such as gateway 140. In 3GPP parlance, devices and gateways are examples of UEs. As shown, the device 145 may be running a device SCL (DSCL) 146 which communicates with the NSCL 126 over the mId interface defined by the architecture. A device application (DA) 147 may also be running on the device 145, and it may communicate with the DSCL 146 over a dIa interface. Similarly, the gateway 140 may implement a gateway SCL (GSCL) 141 that communicates with the NSCL 126 over the mId interface. A gateway application (GA) 142 running on the gateway 140 may communicate with the GSCL 141 via the dIa interface. In general, dIa reference points allow device and gateway applications to communicate with their respective local service capabilities (i.e., service capabilities available at a DSCL or a GSCL, respectively). The mId reference point allows an M2M SCL residing in an M2M Device (e.g., DSCL 146) or an M2M Gateway (e.g., GSCL 141) to communicate with the M2M service capabilities in the network domain (e.g., NSCL 126) and vice versa.

Still referring to FIG. 2, in greater detail, NSCL 126 may be in domain 122 and configured with network application (NA) 127 on an M2M server platform 125. NA 127 and NSCL 126 may communicate via reference point mIa 128. The mIa reference points may allow an NA to access the M2M service capabilities available from an NSCL in an M2M domain.

Typically, the device 145, gateway 140, and M2M server platform 125 comprise computing devices, such as the devices illustrated in Figures FIG. 7C and FIG. 7D and described below. The NSCL, DSCL, GSCL, NA, GA, and DA entities typically are logical entities that are implemented in the form of software, executing on the underlying device or platform, to perform their respective functions in the system 120.

As further shown in FIG. 2, NSCL 131 may be in domain 130 with NA 132. NA 132 and NSCL 131 may communicate via mIa reference point 133. There could also be an NSCL 136 in network domain 135, and NSCL 139 in network domain 138. mIm reference point 123 may be an inter-domain reference point that allows M2M network nodes in different network domains, such as NSCL 126 in network domain 122, NSCL 131 in network domain 130, NSCL 136 in network domain 135, or NSCL 139 in network domain 138, to communicate with one another. For simplicity herein, the term "M2M server" may be used to indicate a service capability server (SCS), NSCL, application server, NA, or an MTC server. In addition, the term user equipment (UE), as discussed herein, may apply to a GA, GSCL, DA, or DSCL. A UE, as discussed herein, may be considered a mobile station, a fixed or mobile subscriber unit, a pager, a cellular telephone, a personal digital assistant (PDA), a smartphone, a laptop, a netbook, a personal computer, a wireless sensor or actuator, consumer electronics, medical devices, automobiles, and the like. A machine-to-machine services capabilities layer entity as discussed herein may include an M2M server or a UE.

While the 3GPP and ETSI M2M architectures are described by way of background herein and may be used to illustrate various embodiments described hereinafter, it is understood that implementations of the embodiments described hereinafter may vary while remaining within the scope of the present disclosure. One skilled in the art will also recognize that the disclosed embodiments are not limited to implementations using the 3GPP or ETSI M2M architectures discussed above, but rather may be implemented in other architectures and systems, such as oneM2M, MQTT, and other M2M systems and architectures.

One function that can be performed in an M2M network, such as in the 3GPP and ETSI M2M network architectures discussed above, is known as a device trigger. A device trigger is a message that is initiated by a network entity, such as an application server, and sent to a device, usually over the control plane of the network. Because the device trigger is sent over the control plane, an IP address is not needed to address the device. Instead, the trigger may be addressed to an external 3GPP identifier of the device, such as a Mobile Station International Subscriber Directory Number (MSISDN) or a Uniform Resource Identifier (URI). Device triggers can server several purposes. For example, device triggers can be used to send small amounts of application or service layer data from an SCS (M2M server) to a UE (M2M device or gateway). Additionally, device triggers can be used to instruct a DA, GA, DSCL or GSCL on a UE to initiate communications with an SCS (M2M server).

In the 3GPP architecture illustrated in FIG. 1, the MTC-IWF can be used to trigger a UE via control plane interfaces, such as T4 and T5. The MTC-IWF will receive trigger requests from an SCS via the Tsp interface and will perform a mapping between the external identifier of the UE and an internal identifier, such as IMSI. The MTC-IWF will report to the SCS the success or failure of a trigger delivery.

Described herein are several techniques that address limitations of existing M2M network architectures in the area of device triggering.

SUMMARY

One problem with existing M2M architectures relates to how a device listens for triggers. Specifically, a device service layer or application that can be triggered listens for triggers on a particular port number. The port number is not defined by any standard. A particular port number is not reserved for triggering, because it would cause conflicts in the case of two instances of the same service layer or application simultaneously trying to listen for triggers on the same port. Instead, it is up to a service layer or application (i.e. D/GSCL) to select an open port to listen on for triggers. The selected port number must be advertised to whatever parties are allowed to trigger the device. Until now, device service layers and applications do not provide this information to an M2M server; no application or service layer protocols define how the port number can be advertised to the SCS. One aspect of the present disclosure provides a solution to this problem. Specifically, in an embodiment, an existing service layer procedure, such as registration, may allow a device or gateway service layer or application to indicate to a machine-to-machine (M2M) server a port on which the device or gateway service layer or application listens for triggers.

Another problem addressed in the present disclosure relates to sending of device or SCL identities "in the clear" (e.g., without a security context). Specifically, when an M2M Server/NSCL is accessed by a device service layer or application over the public internet, there are times when it must send its device and/or D/GSCL identifier "in the clear" when making an initial contact. For example, when an application server, or SCS, makes a bootstrapping request to a device application or device service layer, the request must be sent over the internet before the SCS and device application or service layer have established a security context. A preferable approach would be that the SCS and device service layer or application establish a temporary identifier that can be used during bootstrapping and changed after bootstrapping. But existing M2M architectures, such as ETSI M2M, do not provide a mechanism for the NSCL to provide this information to the D/GSCL. A second aspect of the present disclosure provides a solution to this problem. Specifically, in an embodiment, triggering may be used for bootstrapping. Bootstrapping instructions, which include a temporary identifier for bootstrapping, may be embedded in a trigger request. By Embedding bootstrapping instructions and temporary bootstrapping identifiers in trigger requests, the NSCL is able to initiate bootstrapping with devices that would not otherwise be reachable and the overall bootstrapping process is more secure. Additionally, triggers may be used to assign temporary bootstrapping identifiers in a secure manner.

A third problem addressed in the present disclosure relates to an ETSI M2M service layer process referred to as "long polling." In long polling, a device application or service layer informs the SCS that it wants to be notified when some event occurs. An example of an event is a Network Application write to a particular resource on the SCS. When the event occurs, the SCS will send a notification to the device application or service layer. The device application or service layer may be required to keeps its IP connection with the SCS alive while it waits for a notification. This may necessitate that the device or SCS send periodic "keep-alive" messages to keep the connection alive. These "keep-alive" messages consume network resources. In accordance with a third solution presented herein, triggering is used to make long polling more efficient. Specifically, a method is defined for leveraging the triggering feature to send notifications to a device application or service layer, so that long poling can be more efficient or avoided. Service layer or application instructions are embedded inside of trigger payloads so that the device and SCS can minimize the amount of time that they need to maintain a data plane connection.

A last problem addressed in the present disclosure relates to the format of trigger payloads. Presently, the Tsp reference point mentioned above is based on the known diameter protocol, and messages on the Tsp reference point are defined by 3GPP. The Tsp reference point can be used to send and receive small data packets between the SCS and a UE. When this is done, Tsp Diameter messages will include a Payload Attribute-Value Pair (AVP), or field. The contents of the Payload AVP are completely transparent to the 3GPP network. 3GPP may impose size limits on the Payload, otherwise the Payload format must be defined by the application protocol that is used in the SCS and UE application. Current application and service layer protocols, such as ETSI M2M, do not yet define the format of the trigger payload. The present disclosure defines a trigger payload format that can be used in these instances.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Disclosed herein are concepts related to triggering, such as service layer triggering and application triggering. The first concept uses an existing service layer procedure, such as device, gateway, or application registration, to enable a device or gateway service layer or application to indicate to a machine-to-machine server on which port the device or gateway service layer or application listens for triggers. The second concept discussed herein allows for triggering to be used to provide bootstrapping instructions, including temporary bootstrapping identifiers. In accordance with a third concept disclosed herein, triggering may be used to assist with event notification. Lastly, an exemplary embodiment of a trigger payload format is defined.

Figure 3:
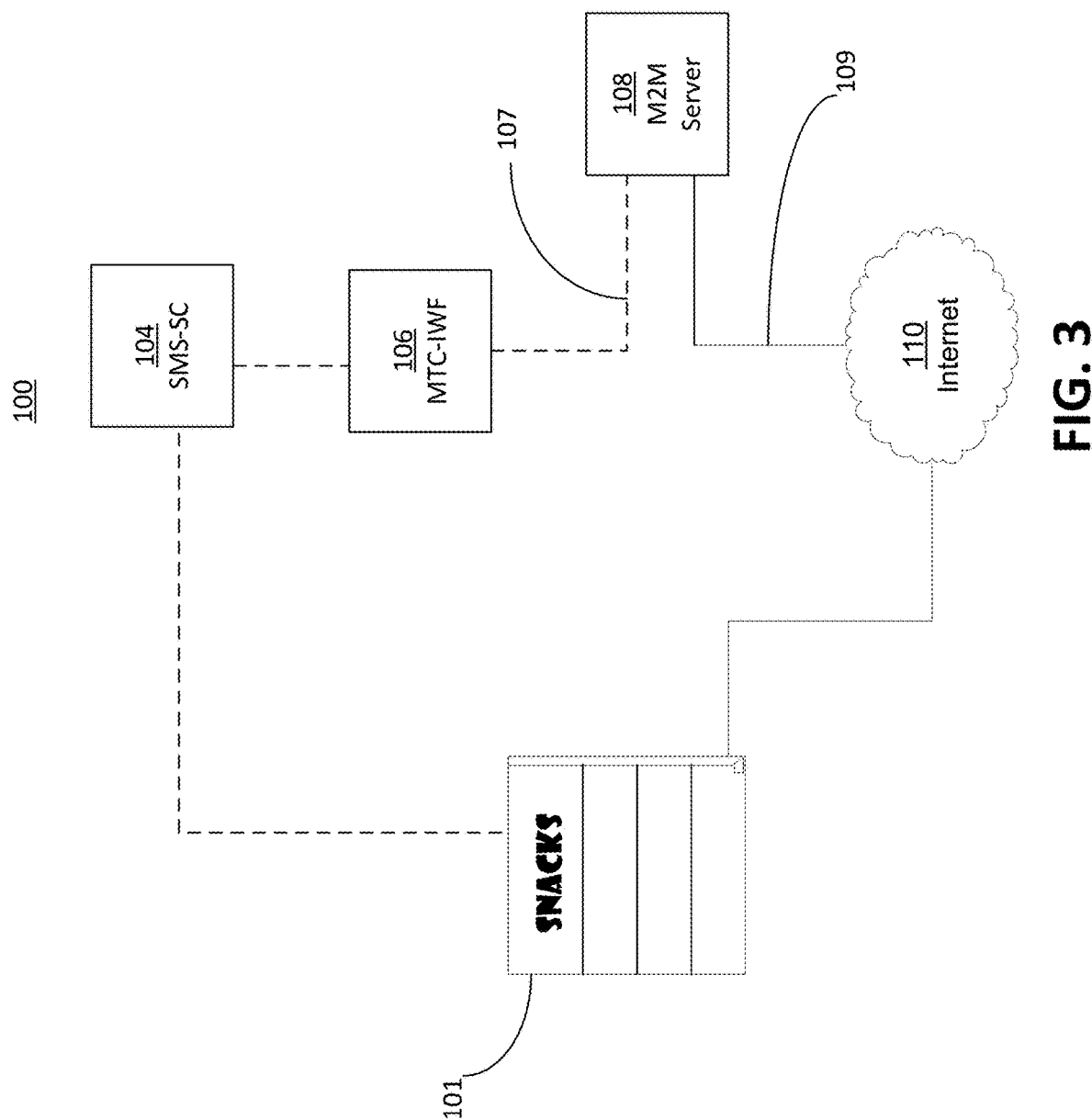
FIG. 3 illustrates an exemplary M2M system in which a first aspect of the present disclosure may be implemented.

With respect to the first concept disclosed herein, involving trigger port number identification, FIG. 3 illustrates an exemplary network 100 for machine type communication (MTC) in which this first concept may be implemented. In FIG. 3, a dotted line represents control plane communication and a solid line represents user plane communication. In this example network 100, M2M server 108 is communicatively connected with Internet 110 via user plane reference point 109 (e.g., the 3GPP Gi/SGi reference point). M2M server 108 is communicatively connected with MTC Inter Working Function (MTC-IWF) 106 via control plane interface 107. Control plane interface 107 may be the Tsp reference point as defined by 3GPP. As further shown, the M2M Server 108, MTC-IWF 106, a vending machine 101 (i.e., user equipment (UE)), and a short message service-service center (SMS-SC) 104 may be communicatively connected with each other via control plane communication channels. Vending machine 101 may also be communicatively connected with M2M server 108 via Internet 110, i.e., the user plane. M2M server 108 may communicate with vending machine 101 via control plane 107 or user plane 109.

In an exemplary embodiment, M2M server 108 may want to communicate with an application or service layer of vending machine 101, but vending machine 101 may have no IP address or M2M server 108 may not know the IP address of vending machine 101. In this scenario, a trigger may be used to facilitate communication between M2M server 108 and vending machine 101. Triggering instructions (e.g., the method of FIG. 4) may be provided to M2M server 108 before a trigger is sent. The vending machine 101 may have a mobile station international subscriber directory number (MSISDN) (e.g., phone number), international mobile subscriber identity (IMSI), a URI, or a 3GPP External Identifier, and a trigger may be initiated by M2M server 108 and sent to vending machine 101 over the control plane based on the MSISDN, IMSI, URI, or 3GPP External Identifier of vending machine 101. The trigger may be an SMS message sent from SMS-SC 104 using the control plane. A field in the SMS message may indicate to vending machine 101 that the SMS message is a trigger. As one example, the trigger may be used to provide the vending machine 101 with an IP address from a dynamic host configuration protocol server or the like, if it does not already have one, so that it can then communicate with M2M server 108 over the user plane (i.e., Internet 110).

Since the trigger is sent over the control plane, an IP address is not needed to initially communicate with vending machine 101. The trigger may be sent to MSISDN, IMSI, URI, or 3GPP External Identifier. The trigger may be used to instruct an application or service layer of vending machine 101 to initiate communications with M2M server 108. In another example, M2M server 108 may use a trigger to instruct vending machine 101 to turn on. If M2M server 108 does not expect a response or the response is a small amount of data, then an IP connection may not be established.

As mentioned above, a device service layer or application that can be triggered, such as a service layer or application that may be executing on the vending machine 101, listens for triggers on a particular port number. The port number used for triggering is not presently defined by any standard. A particular port number is not reserved for triggering, because it would cause conflicts in the case of two instances of the same service layer or application simultaneously trying to listen for triggers on the same port. Instead, it is up to a service layer or application (i.e. a D/GSCL, DA, or GA) to select an open port to listen on for triggers. The selected port number must be advertised to whatever parties are allowed to trigger the device. However, in existing M2M architectures, such as 3GPP MTC and ETSI M2M, device service layers and applications do not provide this information to an M2M server; no application or service layer protocols define how the port number can be advertised to the SCS.

Figure 4:
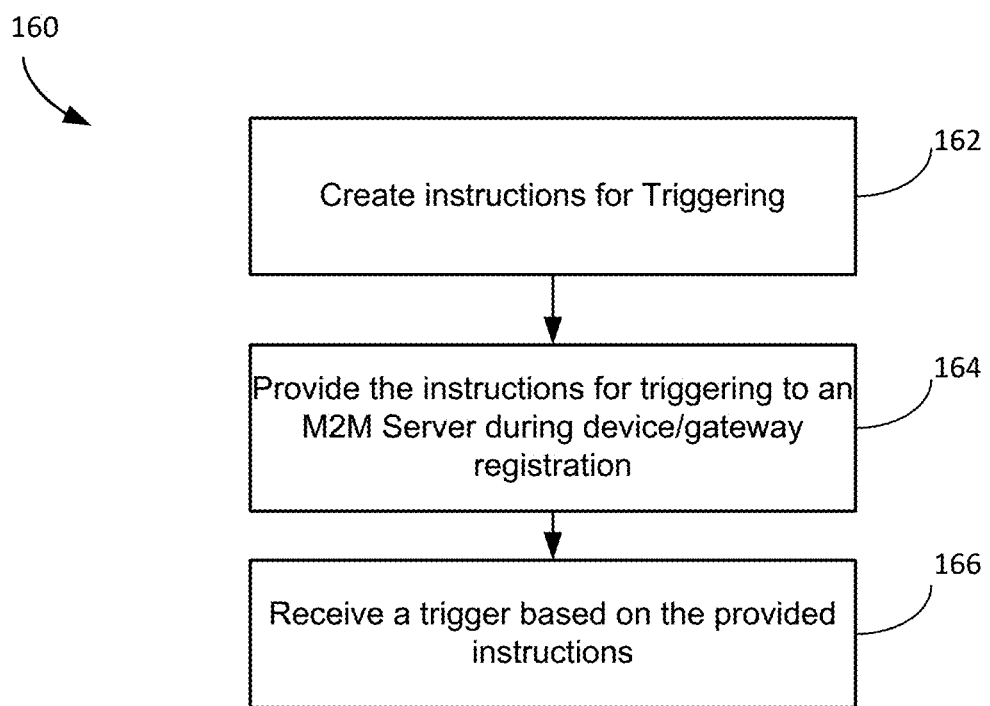
FIG. 4 illustrates a non-limiting, exemplary method of triggering.

FIG. 4 illustrates one example embodiment of a method 160 for providing an M2M server with identification of the trigger port number to be used to trigger a device or gateway application or service layer. FIG. 4 represents a process that may occur in network represented by FIG. 3. In this embodiment, this information is provided to the M2M server during registration of the device or gateway application or service layer, and the information is provided in the form of a trigger instruction.

At step 162, the device or gateway service layer or application (i.e., a UE) creates instructions for triggering. In this embodiment, the instructions include an identification of the port number on which the device or gateway application or service layer listens for triggers.

At step 164, the device or gateway application or service layer transmits the instructions for triggering, which include the identification of the port number on which the device or gateway application or service layer listens for triggers, to the M2M server when registering with the M2M server. In an embodiment in which the M2M system operates in accordance with the ETSI M2M architecture, the ETSI M2M specification (TS 102 921) specifies an SCL Create Request (sclCreateRequestIndication) message, which is to be used by a UE to register with an M2M server. This message is part of a RESTful CREATE operation. ETSI M2M TS 102 921 defines the primitives of the sclCreateRequestIndication message. In accordance with this embodiment, the sclCreateRequestIndication message is modified so that a UE can insert its triggering instructions—specifically its trigger port number identifier—in the message.

Table 1 illustrates one embodiment of a layout of a modified sclCreateRequestIndication message that can be used by an application or service layer of a UE to inform an M2M server of the port number on which it listens for triggers. In particular, two fields have been added—accessNetworkDeviceId and accessNetworkPortId. The access-NetworkDeviceId may be used to provide the 3GPP external identifier, MSISDN, or IMSI of the UE. The accessNetworkPortId field may be used to specify the number of the port on which the application or service layer of the registering UE listens for control plane messages from the access network, i.e., triggers.

When the M2M server receives the modified sclCreateRequestIndication message, it may extract the values from the accessNetworkDeviceId and accessNetworkPortId fields, which together comprise instructions for triggering the UE. Those values can then be stored, for example, in a database or table within or connected with the M2M server so that they can be retrieved for later use when the M2M server wishes to send a trigger to the UE.

Referring again to FIG. 4, at step 166, a trigger may be received based on the instructions provided to the M2M server for triggering. In one embodiment, the method specified in 3GPP TS 23.682 and 3GPP TS 29.368 may be used by the M2M server (e.g., SCS or NSCL) to trigger the UE. In this method, a Device-Action-Request (DAR) command—which is a command of the diameter protocol—is used to request that a trigger be issued to a UE. The DAR command includes an Attribute-Value Pair (AVP), or field, called Trigger-Data. The Trigger-Data AVP includes an Application-Port-Identifier AVP or field. This Application-Port-Identifier field is used to identify the port on which the application or service layer on the UE listens for triggers.

In accordance with the present embodiment, when issuing a trigger to a UE, an M2M Server may use the port number received during UE registration in the accessNetworkPortId field of the modified sclCreateRequestIndication message to populate the Application Port ID field.

Note that the accessNetworkDeviceId and accessNetworkPortId may be updated periodically to correspond to a predetermined time interval. In addition, the identifiers may be updated when a change is made to the port number, when a combination of the port number and another identifier has changed, a set time after a change is made, or a combination of the above. In an example, an accessNetworkPortId may be an unsigned integer, such as 47,600. An accessNetworkDeviceId may be an MSISDN, such as 555-555-1234, or a 3GPP External Identifier such as mikes-vending-machine@mobile-network.com.

TABLE 1

| SCL Primitive sclCreateRequestIndication | |
|---|---|
| | Description |
| Primitive Attribute | |
| requestingEntity | The URI of the UE SCL originally requesting the primitive |
| targetID | The URI of the M2M server where the UE SCL resource shall be created |
| primitiveType | SCL_CREATE_REQUEST |
| Resource | |
| scl | The proposed name of the scl resource to be created in an M2M server. Alternatively, this field may also be used to carry a temporary sclId that was assigned by the last M2M server that the UE was registered with. |
| accessNetworkDeviceId | An access network ID may be the 3GPP External Identifier, MSISDN, or IMSI of a UE. This field may also be used to carry a temporary accessNetworkDeviceId that was assigned by the last M2M server that the UE was registered with. |

TABLE 1-continued

SCL Primitive sclCreateRequestIndication

| | Description |
|---|---|
| accessNetworkPortId | An access network port Id is the port number that the SCL listens on for control plane messages from the access network. Examples of control plane messages include triggers. When making a trigger request, this value is used to populate the Application Port ID field. |

With reference to the second concept mentioned briefly above, triggering may be used for bootstrapping. In particular, a shortcoming of existing M2M architectures may be overcome by embedding bootstrapping instructions, including a temporary identifier for bootstrapping, in trigger requests. Additionally, triggers may be used to assign temporary bootstrapping identifiers in a secure manner.

As mentioned above, when an M2M server is accessed by a service layer or application of a UE over a network, such as the public Internet, there are times when the UE sends its UE identifier "in the clear" when making an initial contact. For example, when a M2M server makes a bootstrapping request to a UE, the request may be sent over the Internet before the M2M server and the UE have established a security context. A preferable approach includes the M2M server and UE establishing a temporary identifier that may be used during bootstrapping. The temporary identifier may then be changed after bootstrapping. But existing M2M architectures, such as 3GPP MTC, ETSI M2M, and oneM2M do not provide a mechanism for the NSCL to provide this information to a D/GSCL. As described hereinafter, this problem is solved by embedding bootstrapping instructions and temporary bootstrapping identifiers in trigger requests. By embedding bootstrapping instructions and temporary bootstrapping identifiers in trigger requests, the M2M server may be able to initiate bootstrapping with devices and gateways that would not otherwise be reachable and secure the overall bootstrapping process.

ETSI TS 102 921 defines a sclCreateResponseConfirm message. Table 2 shows an example of the primitives of the sclCreateResponseConfirm message for the case of a successful sclCreate. The field tempAccessNetworkDeviceId is a temporary UE identifier that is assigned by the M2M server. The M2M server retains a mapping of this identifier to the permanent identifier of the UE. The UE may use this identifier instead of the permanent identifier when the UE makes future registration requests. For example, the M2M server may give the vending machine 101 of FIG. 3 a temporary identifier of tempAccessNetworkDeviceId=qrxp3121994@lmnop.mfs. The M2M server may internally keep a mapping that indicates that qrxp3121994@lmnop.mfs=mikes-vending-machine@mobile-network.com.

TABLE 2

SCL primitive: sclCreateResponseConfirm

| | Description |
|---|---|
| Primitive Attribute | |
| primitiveType | SCL_CREATE_RESPONSE |
| statusCode | STATUS_CREATE |
| resourceURI | The URI of the scl resource that was created under <sclBase>/scls/ |
| tempAccessNetworkDeviceId | The tempAccessNetworkDeviceId identifier is a temporary device identifier. The M2M server retains |

TABLE 2-continued

SCL primitive: sclCreateResponseConfirm

| | Description |
|---|---|
| | a mapping of this identifier to the permanent device identifier of the UE. The UE may use this identifier instead of the permanent identifier when the UE makes future bootstrapping requests. |
| Resource | |
| scl | This is the scl resource created, if Hosting SCL over-wrote the values provided in the request |

Figure 5:
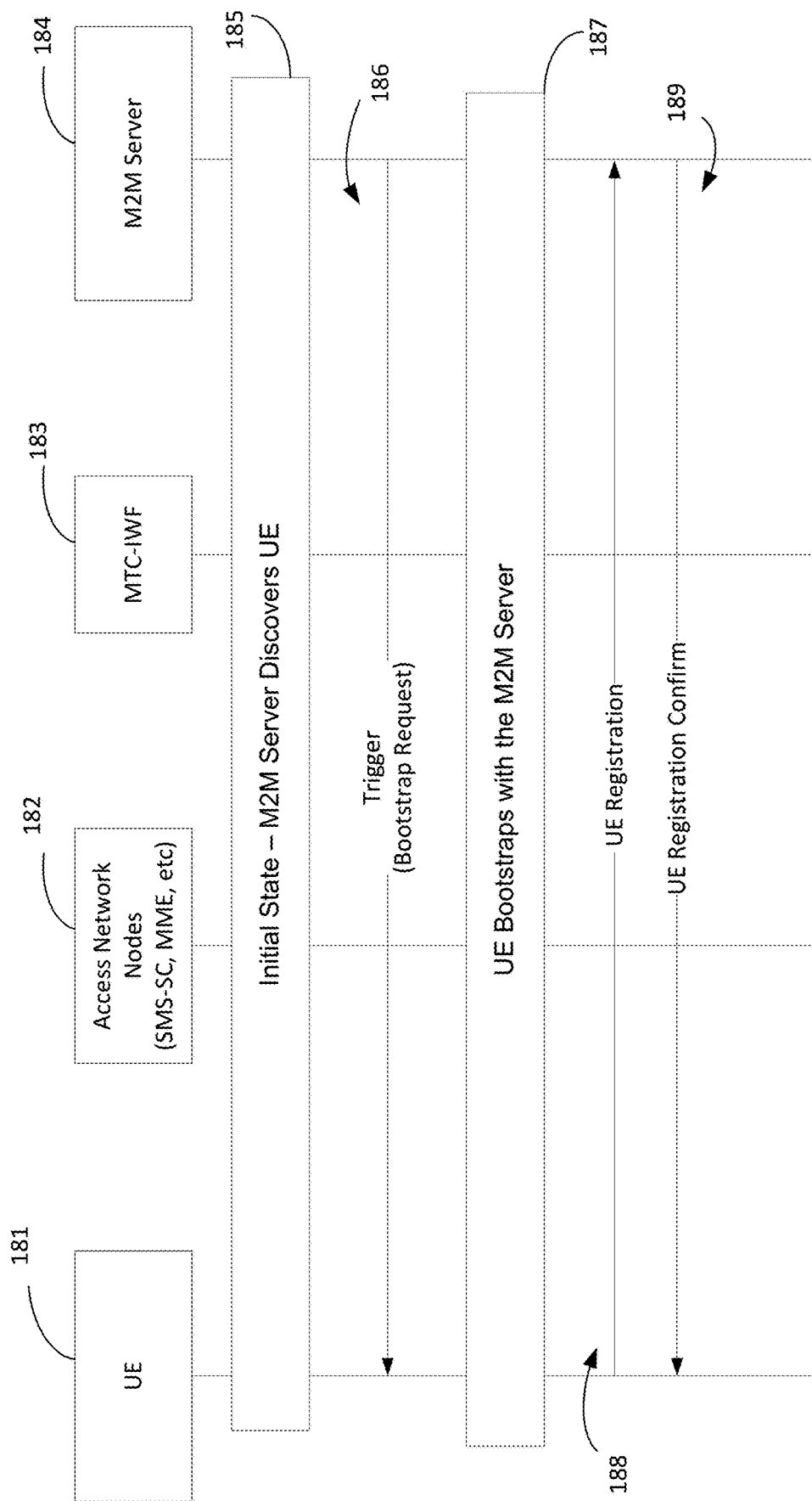
FIG. 5 illustrates bootstrapping and a trigger.

FIG. 5 illustrates one embodiment of an exemplary procedure for using triggering to make bootstrapping or registration requests to a UE. Bootstrapping is the process where a first entity (e.g., a UE) performs authentication and security key establishment with a second entity (e.g., an M2M Server). Registration is the process where a first entity (UE) establishes a service connection with a second entity (M2M Server). After the registration process, the resource corresponding to the UE is created under M2M server resource tree and the resource corresponding to the M2M server is created under the UE resource tree. Often, bootstrapping and registration can be combined into a single step or set of steps. At 185, M2M server 184 discovers UE 181. For example, M2M server 184 may have known UE 181 from a previous connection or UE 181 may have been discovered because another computer (e.g., UE or server) advertised it. At 186, M2M server 184 sends a trigger request destined for UE 181 through MTC-IWF 183 and access network 182. In this embodiment, the M2M server 184 issues a DAR command at step 186, on the Tsp reference point to trigger the UE, for example, in the manner described above in step 166 of FIG. 4. Steps related to creating and providing triggering instructions, such as step 162 and step 164 of FIG. 4, may have already occurred at a previous registration not shown in FIG. 5. As also described above, the UE 181 may be identified by an identifier, such as a 3GPP External Identifier, MSISDN, or IMSI, and an application or service layer executing on the UE may have a designated port number on which it listened for triggers. M2M server 184 may have learned of the UE identifier and port number during discovery or during a previous relationship, for example. When issuing the trigger to UE 181, M2M server 184 may place the port number of the application or service layer in the Application-Port-Identifier field of the Trigger-Data field of the DAR command. When the UE receives the trigger, the port ID may be used to determine what port number to route the trigger to. As described in more detail below, the trigger message may instruct the UE to bootstrap or register with the M2M server 184.

At 187, UE 181 uses information in the received trigger to bootstrap with the M2M server 184. At 188, UE 181 registers with M2M server 184. If desired, creating updated instructions for triggering and providing the updated instructions for triggering to an M2M server during device/gateway registration may occur at or about step 188. At 189, M2M server 184 confirms the registration of UE 181. UE 181 and M2M server 184 form a relationship when registration occurs. Here, UE 181 and M2M server 184 create resources on each other's SCL and are able to begin communication. Also, at registration, triggering instructions are given to M2M server 184 by UE 181.

In more detail, if Protocol for Carrying Authentication for Network Access (PANA) bootstrapping is performed between UE 181 and M2M server 184, then an applicationSpecificPayload field of the trigger may be used to carry the PANA-Auth-Request (PAR) command to initiate bootstrapping. The rest of the PANA bootstrapping procedure may then take place over the user plane. A triggerPurpose field of the trigger request may be set to Bootstrap Request to indicate the request. The destination port number of the trigger request may be set to a well-known PANA port number, the port number that the service layer has specified for listening for a bootstrapping request or a port number where the UE 181 is known to be listening.

Figure 1:
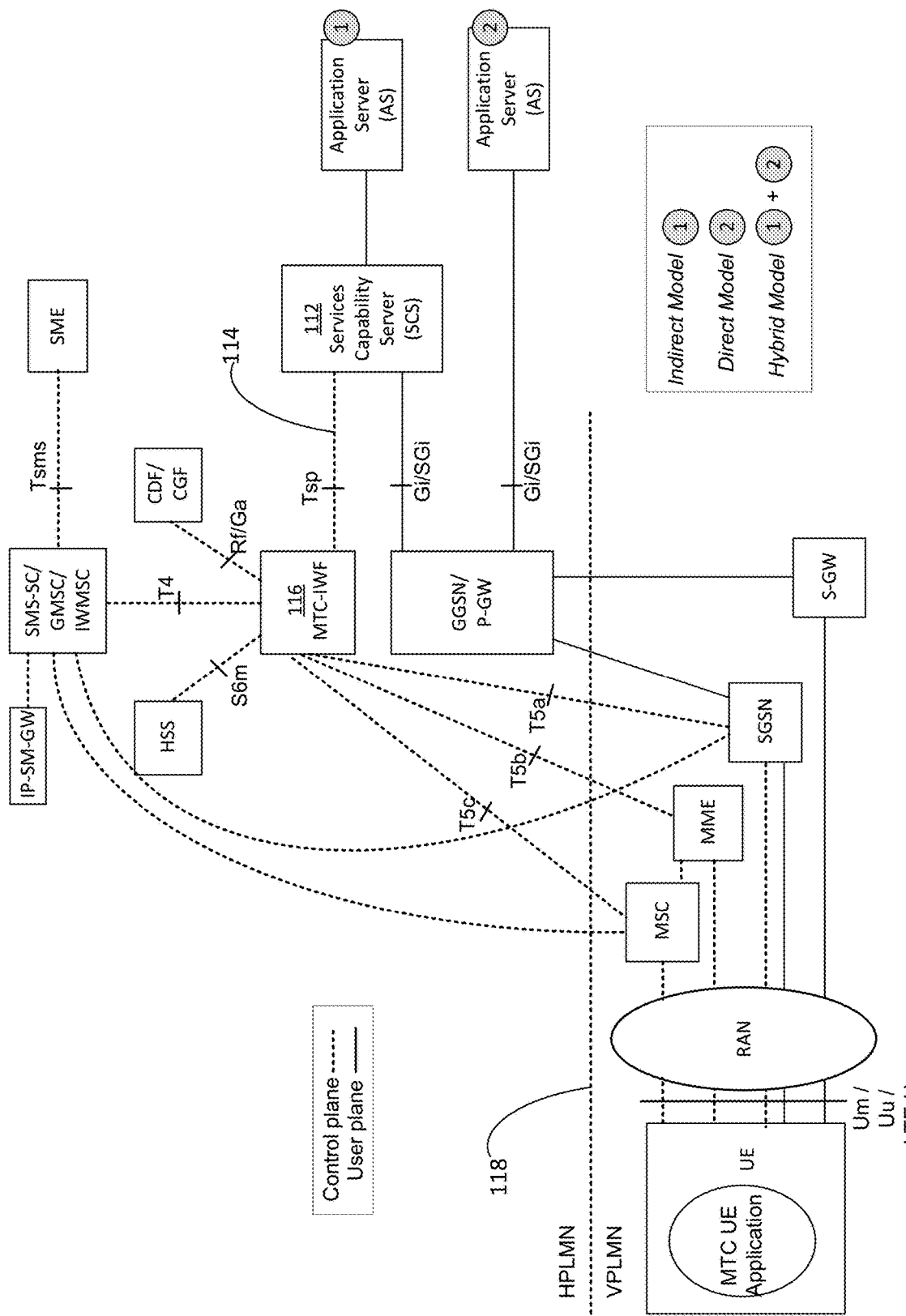
FIG. 1 illustrates a 3GPP architecture for Machine Type Communications (MTC)
Figure 2:
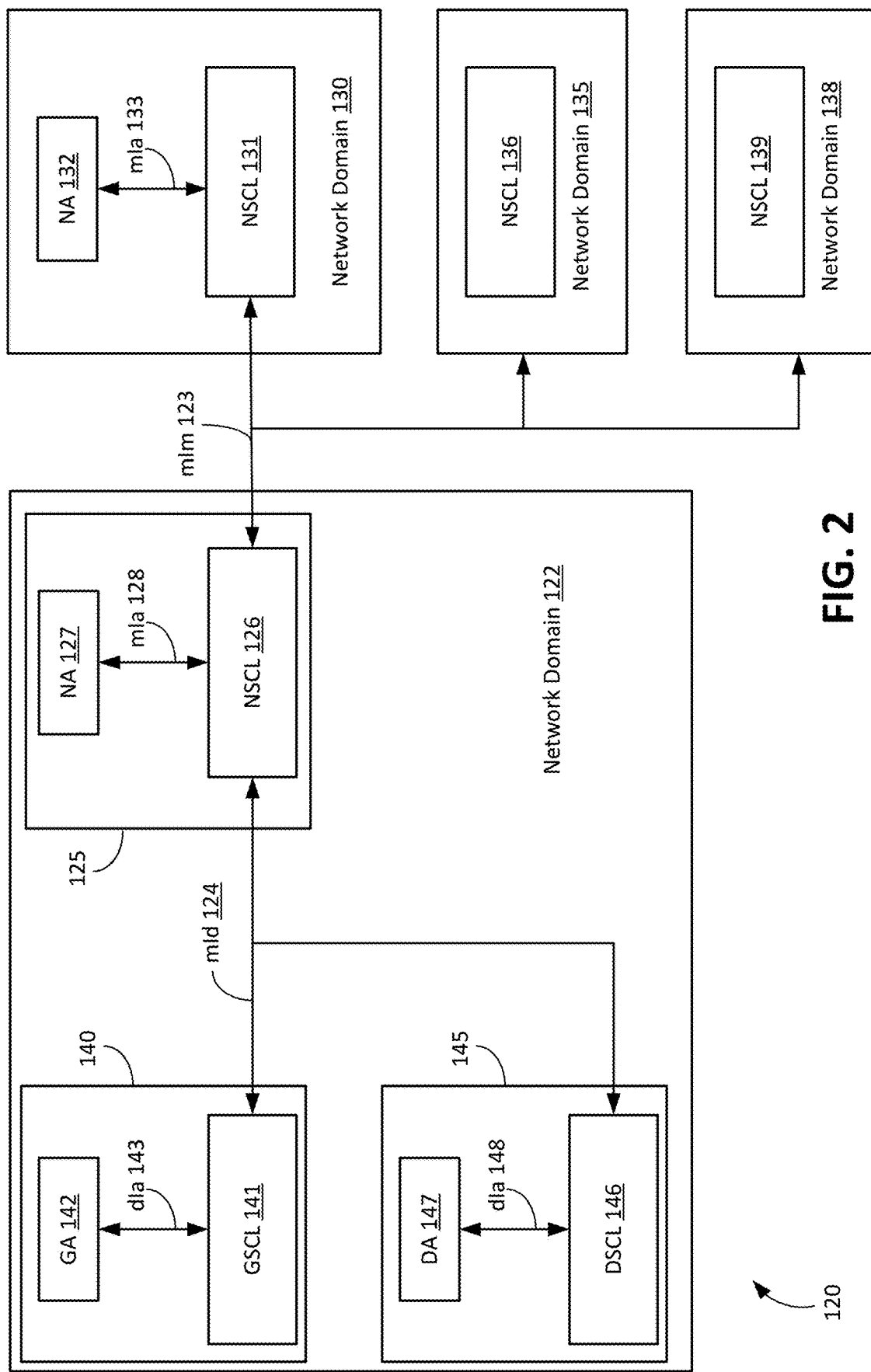
FIG. 2 illustrates an exemplary ETSI M2M architecture including devices and reference points.

As further described above, trigger requests in the 3GPP architecture of FIG. 1 may be initiated over the Tsp reference point between an SCS (i.e., M2M server) and the MTC-IWF. Messages passed over the Tsp reference point are based on the diameter protocol. Specifically, the diameter message for a trigger request will include the details of the trigger in a payload AVP (i.e. field) of the diameter message. However, current application and service layer protocols in existing M2M architectures do not define the format of the trigger payload. To address this shortcoming, the present disclosure defines a payload format for trigger requests that may be used for this purpose.

In particular, disclosed herein is an embodiment of a payload format for a payload-carrying Tsp message sent to a UE by an M2M server. The Tsp trigger payload defined herein may be used with ETSI compliant UEs and NSCLs, for example. Table 3 lays out an exemplary embodiment of this Tsp trigger payload format, in which all or some of the fields may be used. Note that the triggerPurpose field may be used to identify the trigger as a request for bootstrapping.

TABLE 3

TSP Trigger Payload

| Field Name | Description |
| --- | --- |
| scsContactAddress | IPv4 or IPv6 Address of the M2M Server. |
| scsContactPortNumber | The IP port number (UDP or TCP) that should be used to contact the M2M server (e.g., NSCL). |
| scsProtocol | The protocol (HTTP, CoAP, etc.) that is used when contacting the M2M Server. |
| triggerPurpose | 0: Bootstrap Request<br>1: Contact Request<br>2: Application Small Data Delivery<br>3: SCL Small Data Delivery<br>4: Communication Channel Notification - This option may be used when triggering is used as an alternative to long polling. |
| notificationUri | A URI that points the SCL, or Application, to a resource (or container) that is retrieved (e.g., resource hosted on M2M Server or by application in the network). The resource (or container) may describe why the trigger was sent, may provide information, etc. The notification URI field in the trigger payload may be used to point the DSCL to a URI that the DSCL previously subscribed, in order to be informed of updates to a resource. When the purpose of the trigger is a Communication Channel Notification, the notificationURI points to the communication channel URI. |
| applicationIdentifier | If the trigger recipient is a service that dispatches the trigger contents to a targeted application, then this field is used to identify the targeted application. In ETSI M2M terms, if there is an application specific payload in the trigger that should be passed from an SCL to an application over the dIa reference point, then this field assists identifying the application. |
| applicationSpecificPayload | This payload is passed over the dIa to the application that is identified in the applicationIdentifier field. |
| sclPayload | This SCL payload is delivered to the UE. |
| temporaryDeviceId | If the purpose of the trigger is to request that the UE bootstrap - for example in accordance with the method illustrated in FIG. 5 - then this field may include a temporary device identifier for the UE when bootstrapping. |
| temporarySclId | If the purpose of the trigger is to request that the UE bootstrap - for example in accordance with the method illustrated in FIG. 5 - then this field may include a temporary SCL identifier for an SCL when bootstrapping. This may be generalized to a service layer or application that may bootstrap and register to the M2M server. Applications (or at least the devices they are hosted on) may bootstrap and register to a service layer. |

With reference to the third concept mentioned above, triggering may be used to send notifications to a device application or service layer. This disclosed technique addresses a shortcoming with the "long polling" process in existing M2M architectures. As mentioned above, in long polling, a device application or service layer informs the SCS that it wants to be notified when some event occurs. An example of an event is a Network Application write to a particular resource on the SCS. When the event occurs, the SCS will send a notification to the device application or service layer. The device application or service layer may be required to keeps its IP connection with the SCS alive while it waits for a notification. This may necessitate that the device or SCS send periodic "keep-alive" messages to keep the connection alive. These "keep-alive" messages consume network resources. As described hereinafter, triggering may be used to make long polling more efficient. Specifically, a method is defined for leveraging the triggering feature to send notifications to a device application or service layer, so that long poling can be more efficient or avoided. Service layer or application instructions are embedded inside of trigger payloads so that the device and SCS can minimize the amount of time that they need to maintain a data plane connection.

Presently, ETSI M2M reference TS 102 690 defines service layer long polling, which as mentioned above, may be used by a UE to inform an M2M server that it wants to be notified when an event occurs. An example of an event is a network application writing to a particular resource on the M2M server. Referring to the Example M2M environment of FIG. 3, an example may include updating a resource on M2M server 108 with updated pricing information. When the update occurs, M2M server 108 sends a notification to vending machine 101. Vending machine 101 (i.e., UE) may be required to keeps its IP connection with M2M server 108 alive while it waits for a notification. As a result, vending machine 101 or M2M server 108 may send periodic "keep-alive" messages to keep the IP connection alive. These "keep-alive" messages consume network resources.

To solve this problem, a trigger may be sent over the control plane to notify the UE of events. A trigger payload may include a notificationUri field—for example, as shown in the example trigger payload format of Table 3. The notificationUri field points a UE service layer or application to a resource that should be retrieved. A triggerPurpose field—such as the one provided in the example trigger payload format of Table 3—may be used by the M2M server to indicate to the device application or service layer that the trigger is a "Communication Channel Notification." For example, the triggerPupose field of the format illustrated in Table 3 would be set to 4. In this embodiment, the "Communication Channel Notification" value in the triggerPurpose field is an indication that some event occurred or a request for the UE to retrieve some information about an event that occurred. As further shown in Table 3, the trigger payload may include an applicationIdentfier, and when the trigger is sent through a service layer or a trigger dispatch function, the applicationIdentfier field may be used to identify the targeted application. In an example such as that illustrated in FIG. 3, the vending machine 101 might have a DSCL that receives the trigger. There may be several applications running on top of the DSCL. One application may manage pricing and another may manage maintenance records. The application identifier in the applicationIdentifier field may be used to identify that the application specific payload should be passed to the pricing application. With further reference to the trigger payload format of Table 3, the applicationSpecificPayload field may hold a pointer (e.g. a URI) to a resource on the NSCL that includes updated pricing information. Alternatively, this field may carry the actual pricing information, or this field may contain an indication that the vending machine should contact the NSCL to find out why the trigger was sent.

For example, referring to FIG. 3, vending machine 101 may contain several vending items. M2M server 108 may have updated prices for the vending items contained in a resource or a URI, for example. M2M server 108 may send vending machine 101 a trigger to read the resource to find out the new pricing. The trigger payload may include the URI that needs to be read by vending machine 101. The message in the payload conveys to vending machine 101 to read a particular URI for further information. When vending machine 101 receives the trigger, it will usually establish an IP connection (if it does not already have one) and then contact M2M Server 108 to determine why it was triggered. The message may be an SMS type message. The size of the payload is very limited so the payload, in many cases, may just direct vending machine 101 to get more information from a URI.

Figure 6:
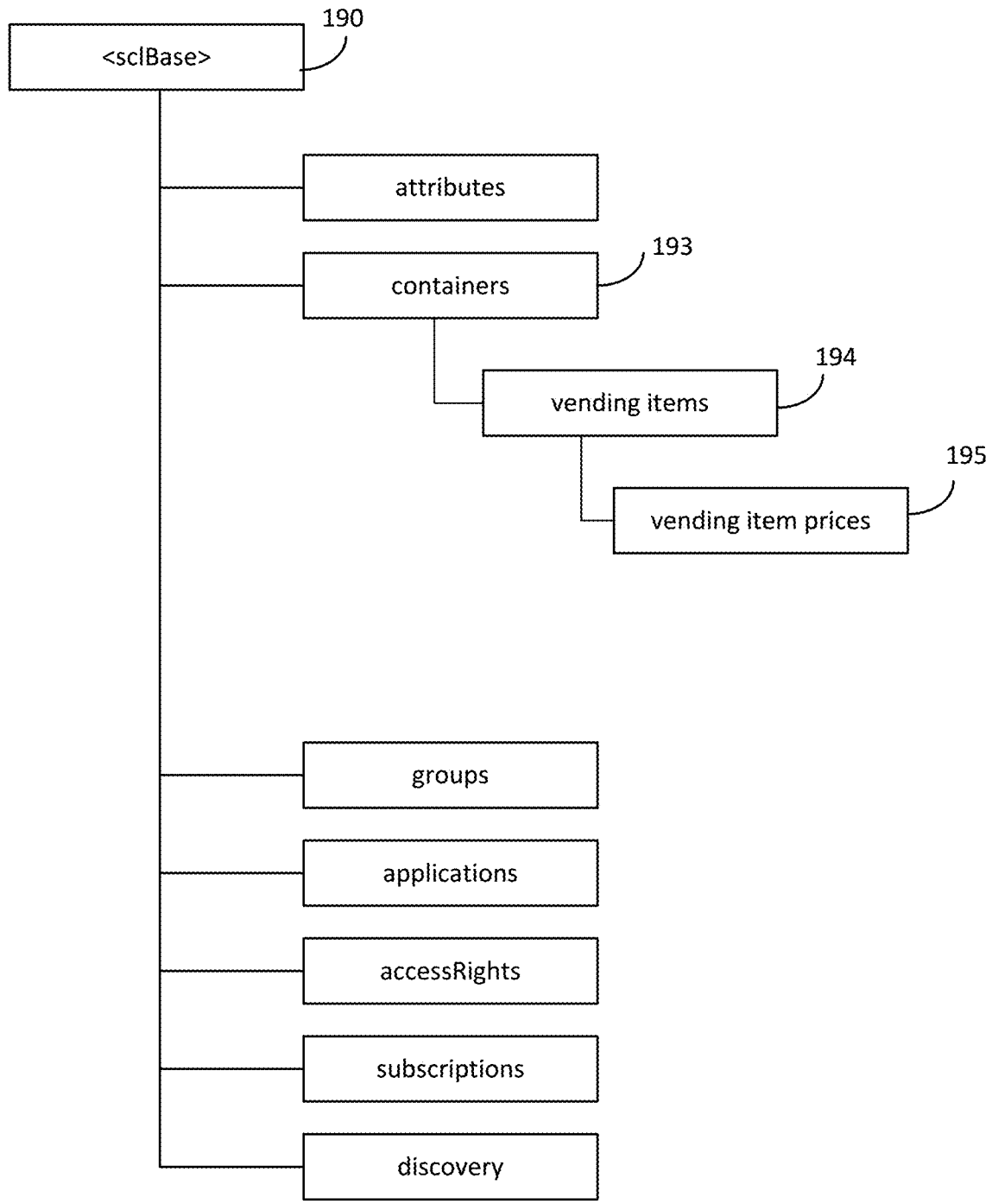
FIG. 6 illustrates an exemplary resource structure.

On an ETSI M2M SCL, the resources are managed as a tree structure as shown in FIG. 6. <sclBase> resource 190 contains all other sub-resources of the hosting M2M SCL (e.g., vending machine 101 or M2M server 108). <sclBase> resource 190 is the root of the other resources it contains. <sclBase> resource 190 is represented by an absolute URI. Other resources hosted in the SCL are identified by a URI that is hierarchically derived from the URI of the <sclBase> resource 190. For example, with regard to the vending machine prices as discussed herein, the directory structure may be <sclBase> 190/containers 193/vending items 194/vending item prices 195.

By embedding service layer or application instructions inside of a trigger payload as described above, the UE and M2M server can minimize the amount of time that they need to maintain a data plane connection, as would otherwise be the case with traditional long polling.

Figure 7A:
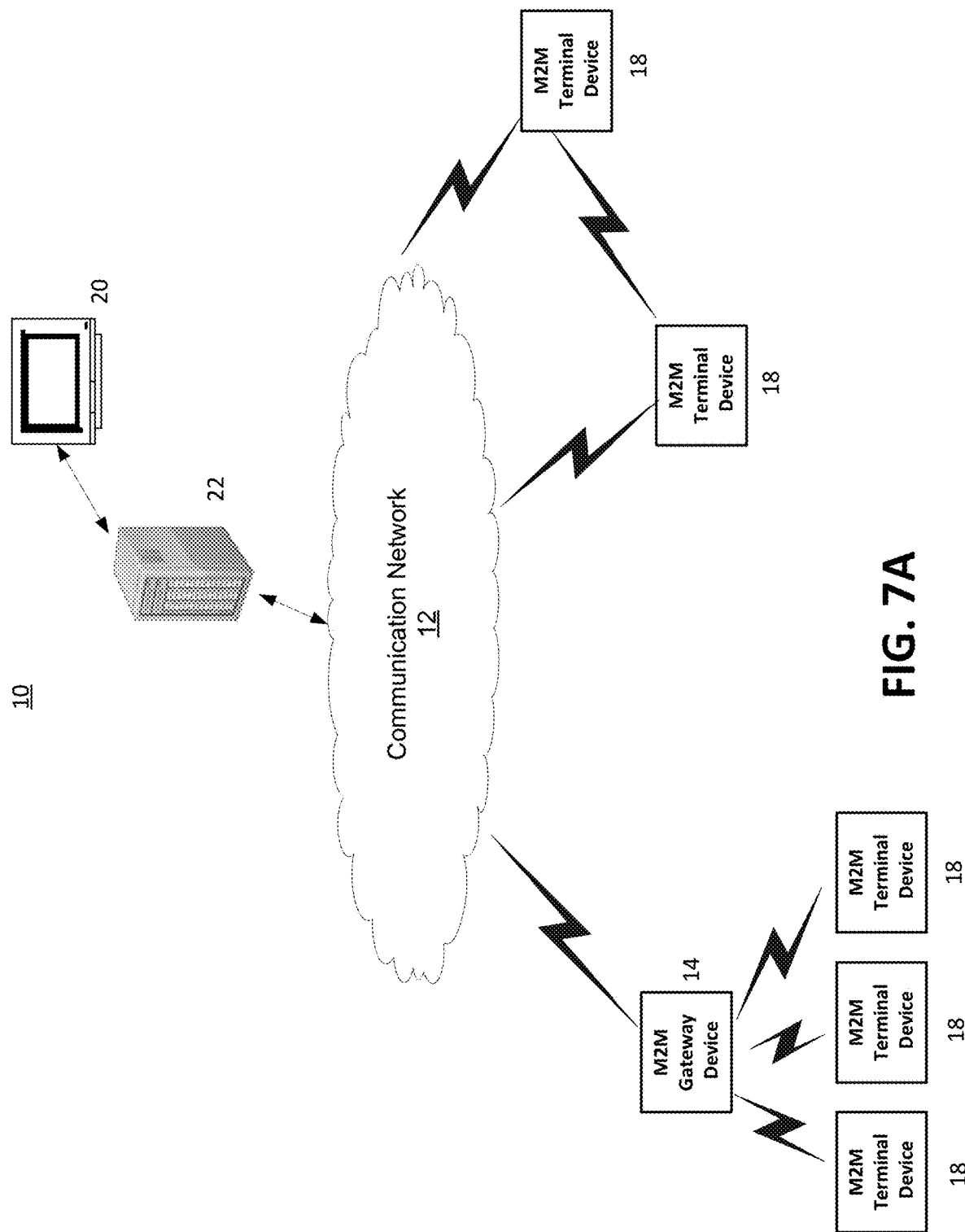
FIG. 7A is a system diagram of an example machine-to-machine (M2M) or Internet of Things (IoT) communication system in which one or more disclosed embodiments may be implemented.

FIG. 7A is another diagram of an example machine-to machine (M2M) or Internet of Things (IoT) communication system 10 in which one or more disclosed embodiments may be implemented. Generally, M2M technologies provide building blocks for the IoT, and any M2M device, gateway or service platform may be a component of the IoT as well as an IoT service layer, etc.

As shown in FIG. 7A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 7A, the M2M/IoT communication system 10 may include an M2M gateway device 14 and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example.

The illustrated M2M service platform 22 provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18 and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 7B:
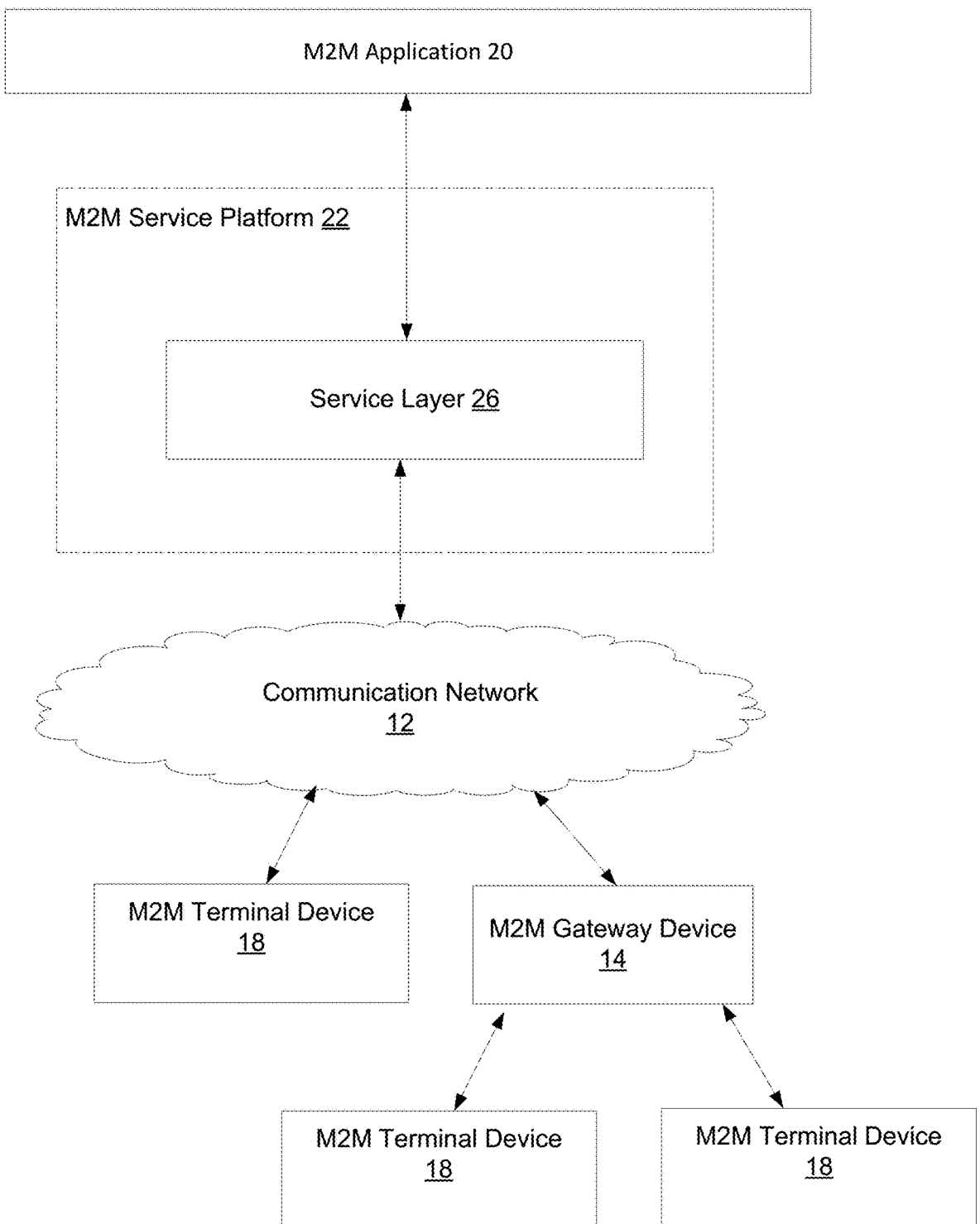
FIG. 7B is a system diagram of an example architecture that may be used within the M2M/IoT communications system illustrated in FIG. 7A.

Referring also to FIG. 7B, the M2M service platform typically implements a service layer 26 (e.g. a network service capability layer (NSCL) as described herein) that provides a core set of service delivery capabilities, such as triggering, that diverse applications and verticals can leverage. These service capabilities enable M2M applications 20 to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that communicate using triggering, as discussed herein. M2M applications 20 may include applications in various industries such as, without limitation, transportation, health and wellness, connected home, energy management, asset tracking, and security and surveillance. As mentioned herein, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20.

Figure 7C:
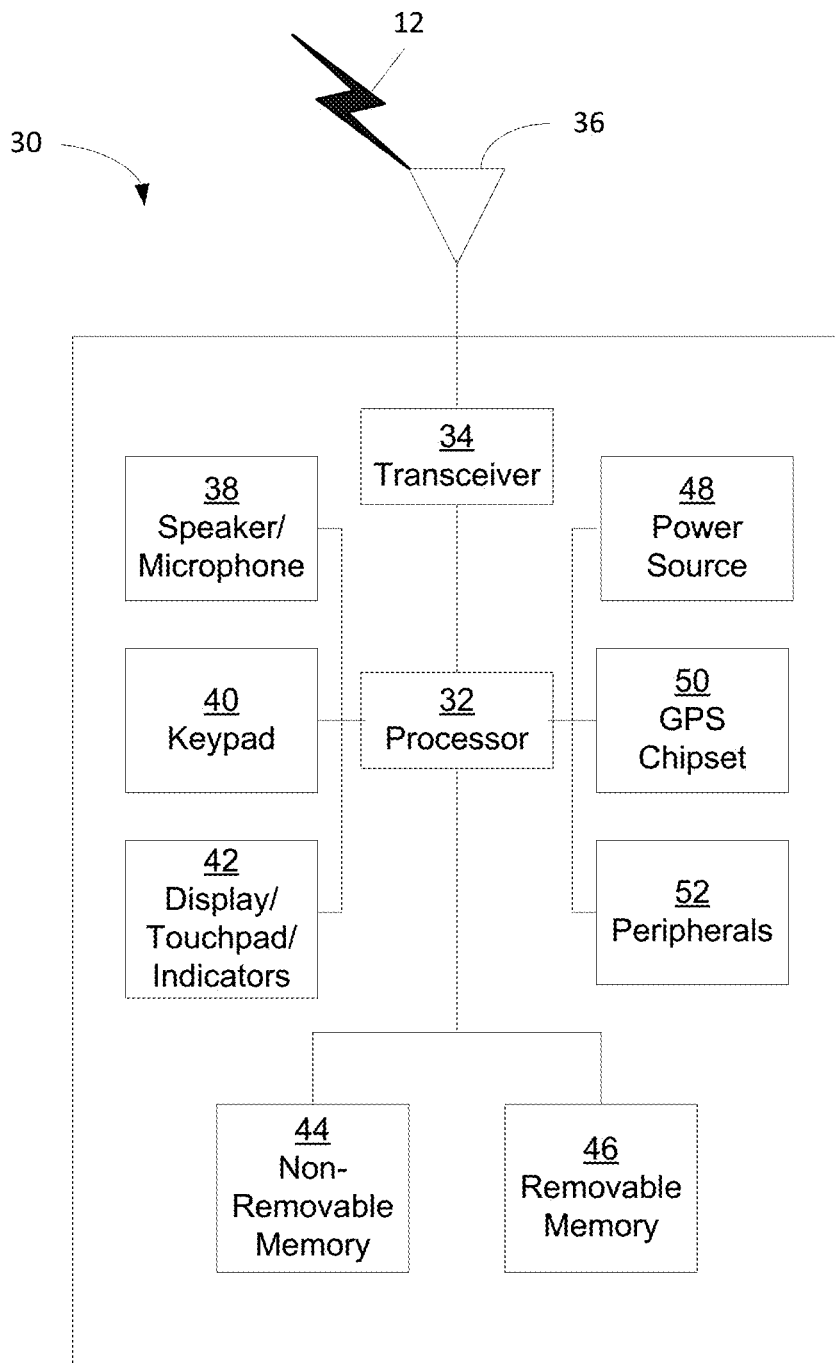
FIG. 7C is a system diagram of an example M2M/IoT terminal or gateway device that may be used within the communications system illustrated in FIG. 7A.

FIG. 7C is a system diagram of an example M2M device 30, such as an M2M terminal device 18 or an M2M gateway device 14, for example. As shown in FIG. 7C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed of systems and methods for device triggering.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 7C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 7C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to whether the triggering (e.g., service layer trigger port numbers or bootstrapping identifiers) in some of embodiments described herein is successful or unsuccessful, or otherwise indicate the status of resource propagation processes.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 7D:
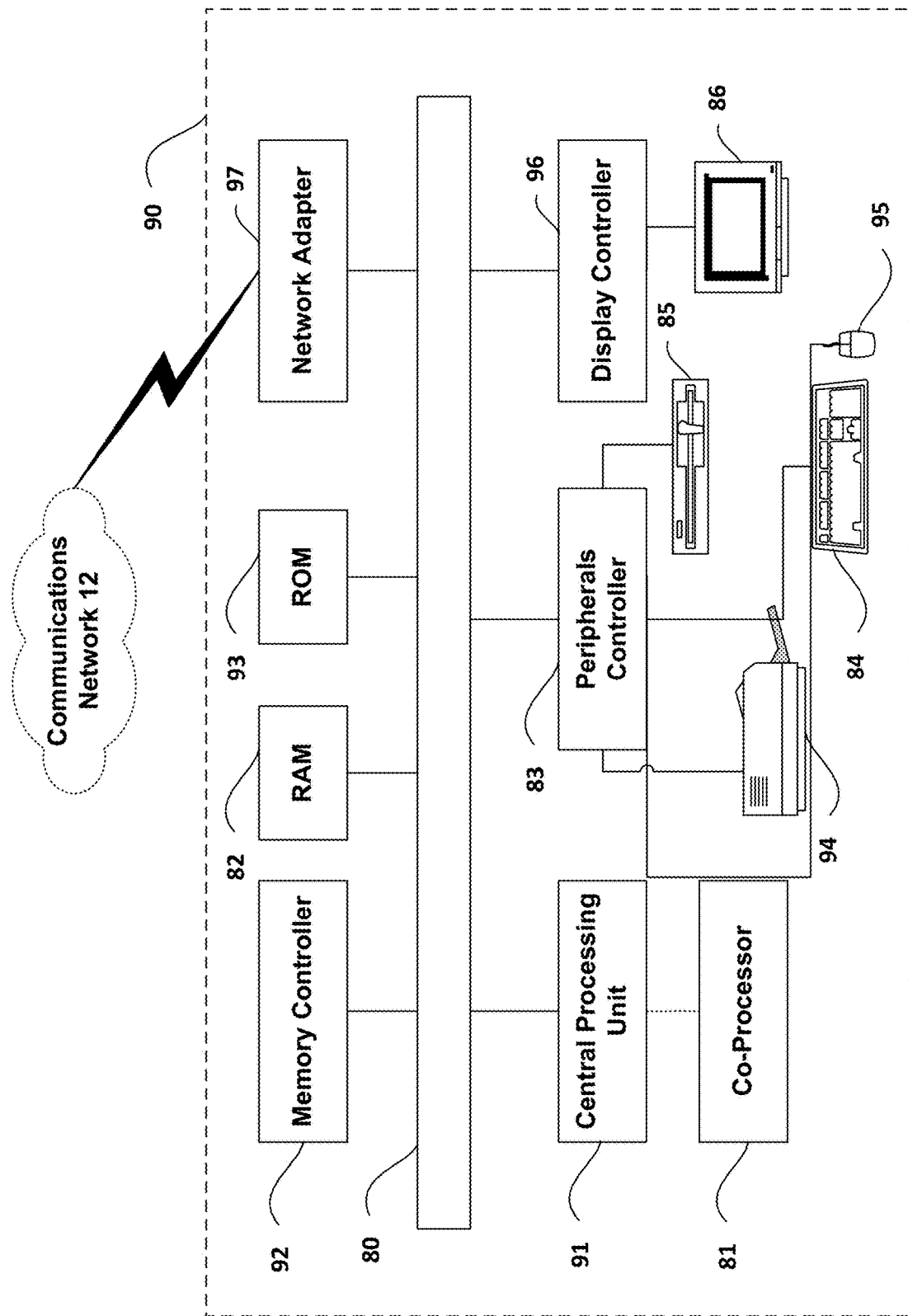
FIG. 7D is a block diagram of an example computing system in which aspects of the communication system of FIG. 7A may be embodied.

FIG. 7D is a block diagram of an exemplary computing system 90 on which, for example, the M2M service platform 22 of FIG. 7A and FIG. 7B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for triggering, such as exchanging triggering message over the control plane.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 7A and FIG. 7B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Generally, the terms service capability server (SCS), NSCL, application server, M2M Server, and MTC server may be used interchangeably herein. Any appropriate identifier, not just the Application-Port-Identifier known to the M2M server, may be used, as discussed herein. The use of triggering as discussed herein may be used with any appropriately configured computing device. For example, devices that are not related to machine-to-machine may use the systems and methods herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A user equipment comprising:
a processor; and
a memory coupled with the processor, the memory having stored thereon executable instructions that when executed by the processor cause the processor to effectuate operations comprising:
receiving a service layer trigger message from a second apparatus, wherein the service layer trigger message is sent over a control plane and comprises:
an internet protocol address of the remote device, and
a port number, or an access network device identifier and a port number, the access network device identifier comprising a mobile station international subscriber directory number (MSISDN), 3GPP external identifier, or international mobile subscriber identity (IMSI), and
trigger purpose information, wherein the trigger purpose information comprises a request for the user equipment of a 3GPP communication network to bootstrap with a service layer of a second apparatus; and
transmitting a request to bootstrap with the service layer of the second apparatus,
wherein bootstrapping comprises performing authentication and security key establishment for a service.

2. The user equipment of claim 1, wherein the control plane is associated with a wireless network.

3. The user equipment of claim 1, wherein the trigger message comprises:
an indication that a purpose of the trigger message is a notification of an event, and a universal resource indicator that directs the second apparatus to details of the event.

4. The user equipment of claim 1, wherein the user equipment periodically transmits an update of the port number.

5. The user equipment in the communication network of claim 1, wherein the trigger message comprises a temporary identifier for the second apparatus to use when communicating with the user equipment via a user plane.

6. The user equipment of claim 1, wherein the user equipment periodically transmits an update of the access network device identifier.

7. The method of claim 1, wherein the control plane is associated with a wireless network.

8. The method of claim 1, wherein the trigger message comprises:
an indication that a purpose of the trigger message is a notification of an event, and a universal resource indicator that directs the second apparatus to details of the event.

9. The method of claim 1, wherein the user equipment periodically transmits an update of the port number.

10. The method of claim 1, wherein the trigger message comprises a temporary identifier for the second apparatus to use when communicating with the user equipment via a user plane.

11. The user equipment of claim 1, wherein the service layer is a service supporting service capabilities through a set of functional interfaces between entities.

12. A method comprising:
receiving a service layer trigger message from a second apparatus, wherein the service layer trigger message is sent over a control plane and comprises:
an internet protocol address of the remote device, and
a port number, or an access network device identifier and a port number, the access network device identifier comprising a mobile station international subscriber directory number (MSISDN), 3GPP external identifier, or international mobile subscriber identity (IMSI), and
trigger purpose information, wherein the trigger purpose information comprises a request for a user equipment of a 3GPP communication network to bootstrap with the service layer of a second apparatus; and
transmitting a request from the user equipment to bootstrap with the service layer of the second apparatus, wherein bootstrapping comprises performing authentication and security key establishment for a service.

13. The method of claim of 12, wherein the service layer is a service supporting service capabilities through a set of functional interfaces between entities, wherein the service layer is defined according to ETSI/oneM2M standards.

14. A method for a second apparatus in a 3GPP communication network, the method comprising:
transmitting a service layer trigger message to a first apparatus, wherein the first apparatus is a user equipment: wherein the service layer trigger message is sent over a control plane and comprises:
an internet protocol address of the remote device, and
a port number, or an access network device identifier and a port number, the access network device identifier comprising a mobile station international subscriber directory number (MSISDN), 3GPP external identifier, or international mobile subscriber identity (IMSI), and
trigger purpose information, wherein the trigger purpose information comprises a request for the first apparatus to bootstrap with the service layer of a second apparatus of a 3GPP communication network; and
receiving a request from the first apparatus to bootstrap with the service layer of the second apparatus, wherein bootstrapping comprises performing authentication and security key establishment for a service.

15. The method of claim 14, wherein the control plane is associated with a wireless network.

16. The method of claim 14, wherein the trigger message comprises:
an indication that a purpose of the trigger message is a notification of an event, and a universal resource indicator that directs the second apparatus to details of the event.

17. The method of claim 14, wherein the first apparatus periodically transmits an update of the port number.

18. The method of claim 14, wherein the trigger message comprises a temporary identifier for the second apparatus to use when communicating with the first apparatus via a user plane.

19. The method of claim 14, wherein the first apparatus periodically transmits an update of the access network device identifier.

20. The method of claim 14, wherein the service layer is a service supporting service capabilities that enable machine-to-machine applications.

* * * * *